(12) United States Patent
Fujita (10) Patent No.: US 11,316,203 B2
(45) Date of Patent: Apr. 26, 2022

(54) SECONDARY BATTERY AND DEVICE INCLUDING SECONDARY BATTERY

(71) Applicant: NAMICS CORPORATION, Niigata (JP)

(72) Inventor: Takayuki Fujita, Niigata (JP)

(73) Assignee: NAMICS CORPORATION, Niigata (JP)

(*) Notice: Subject to any disclaimer, the term of this patent is extended or adjusted under 35 U.S.C. 154(b) by 98 days.

(21) Appl. No.: 16/614,809

(22) PCT Filed: May 22, 2018

(86) PCT No.: PCT/JP2018/019600
§ 371 (c)(1),
(2) Date: Nov. 19, 2019

(87) PCT Pub. No.: WO2018/221309
PCT Pub. Date: Dec. 6, 2018

(65) Prior Publication Data
US 2020/0176820 A1 Jun. 4, 2020

(30) Foreign Application Priority Data
May 29, 2017 (JP) .............................. JP2017-105344

(51) Int. Cl.
*H01M 10/0569* (2010.01)
*H01M 4/38* (2006.01)
(Continued)

(52) U.S. Cl.
CPC ....... *H01M 10/0569* (2013.01); *H01M 4/387* (2013.01); *H01M 4/42* (2013.01);
(Continued)

(58) Field of Classification Search
None
See application file for complete search history.

(56) References Cited

U.S. PATENT DOCUMENTS 5,055,171 A * 10/1991 Peck .................... H01M 10/36
204/290.05
5,300,371 A 4/1994 Tomantschger
(Continued)

FOREIGN PATENT DOCUMENTS

JP S61248370 A 11/1986
JP H08508847 A 9/1996
(Continued)

OTHER PUBLICATIONS

International Search Report dated Aug. 7, 2018 filed in PCT/JP2018/019600.

*Primary Examiner* — Laura Weiner
(74) *Attorney, Agent, or Firm* — Rankin, Hill & Clark LLP (57) ABSTRACT

A secondary battery having high electromotive force and including less lead or being free of lead is provided. The secondary battery includes a positive electrode including a positive electrode active material containing manganese oxide, a negative electrode including a negative electrode active material containing at least one selected from zinc, gallium, and tin, and an electrolytic solution containing at least one selected from phosphoric acid and organic oxoacid and having a pH of less than 7 at 25° C. This secondary battery has an open circuit voltage of more than 1.6 V in a fully charged state.

11 Claims, 4 Drawing Sheets

(51) Int. Cl.
*H01M 4/42* (2006.01)
*H01M 4/505* (2010.01)
*H01M 10/0567* (2010.01)
*H01M 10/42* (2006.01)

(52) U.S. Cl.
CPC ....... *H01M 4/505* (2013.01); *H01M 10/0567* (2013.01); *H01M 2010/4271* (2013.01)

(56) References Cited

U.S. PATENT DOCUMENTS

2006/0127761 A1   6/2006  Phillips
2015/0287988 A1  10/2015  Xu

FOREIGN PATENT DOCUMENTS

| JP | 2609609 B2 | 5/1997 |
| JP | 2007214125 A | 8/2007 |
| JP | 2012209048 A | 10/2012 |
| JP | 2016520969 A | 7/2016 |

* cited by examiner

20μm    ELECTRON MICROSCOPE IMAGE 1

SECONDARY BATTERY AND DEVICE INCLUDING SECONDARY BATTERY

TECHNICAL FIELD

The present invention relates to a secondary battery that is repeatedly usable through a charge-discharge reaction. The present invention also relates to a device including the secondary battery.

BACKGROUND ART

Lead-acid batteries have been widely used as one example of secondary batteries. This secondary battery is a battery in which lead oxide is used as a positive electrode active material, metal lead is used as a negative electrode active material, and sulfuric acid is used as an electrolytic solution. As the discharge reaction is advanced in the lead-acid battery, the lead oxide as the positive electrode active material reacts with sulfate ions in the electrolytic solution and turns into lead sulfate and at the same time, bonded oxygen is lost. This bonded oxygen reacts with hydrogen ions in the electrolytic solution and thus, water is generated. At the same time, the metal lead in the negative electrode similarly reacts with the sulfate ions and thus, lead sulfate is generated. This lead sulfate is generated on a surface of the metal lead as the negative electrode active material. The lead sulfate generated on surfaces of the positive and negative active materials is insoluble in sulfuric acid and therefore remains on both active materials.

On the other hand, the lead sulfate generated on the surface of the positive electrode by the charge reaction in the lead-acid battery is oxidized to become lead oxide. The lead sulfate generated on the surface of the negative electrode is reduced to become the metal lead and returns to the state before the discharge reaction.

Accordingly, the lead-acid battery has the following (1) to (3) characteristics: (1) the lead oxide as the positive electrode active material and the metal lead as the negative electrode active material are preferable electron conductors; (2) the sulfuric acid as the electrolytic solution is an aqueous electrolytic solution and the ion conductivity is higher than that of a nonaqueous solution (organic electrolytic solution) that is used in a lithium ion secondary battery; and (3) the lead sulfate generated on the surfaces of both active materials by the reaction with the sulfate ions is insoluble in sulfuric acid and thus remains precipitated on the surfaces of the electrodes.

As described above, the lead-acid battery is featured in having the high discharge rate characteristic because of the high electron conductivity of the electrode active material, the high ion conductivity of the electrolytic solution, and the close contact of the reaction product in the discharge on the surface of the electrode.

The lead-acid battery has high stability in a fully charged state because of the reaction mechanism of the lead-acid battery, and in this point, the lead-acid battery is different from the lithium ion secondary battery that is one kind of secondary batteries. Therefore, the lead-acid battery is suitably used in the application where the lead-acid battery is always used in the fully charged state. For example, the battery is suitably used in an automobile or a motorcycle because the battery is always in the fully charged state during the travel and high power needs to be extracted when the engine is started. Moreover, since lead and sulfuric acid are inexpensive materials, the lead-acid battery has been used widely as the secondary battery.

One example of the batteries formed of metal materials other than lead is a printed battery disclosed in Patent Literature 1. This printed battery includes an anode formed by printing a manganese oxide paste and a cathode formed by printing a zinc paste, the anode and the cathode being stacked through a separator impregnated with an electrolytic solution. In this printed battery, the electrolytic solution contains 2 to 25 wt % of phosphoric acid.

An alkaline battery according to Patent Literature 2 includes zinc alloy containing aluminum as the negative electrode active material. This alkaline battery is featured in that the electrolytic solution for the gel zinc negative electrode including negative electrode active material is an electrolytic solution containing phosphoric acid or phosphate ions including alkali salt of phosphate.

In addition, a rechargeable electrochemical battery disclosed in Patent Literature 3 includes a container (12), a rechargeable zinc minus electrode (14), an ion-conductive aqueous electrolyte, a manganese dioxide.plus electrode (18), a separator (16), an airtight plug member (22), and terminal means (26, 28).

CITATION LIST

Patent Literature

Patent Literature 1: JP-A-2012-209048
Patent Literature 2: Japanese Patent No. 2609609
Patent Literature 3: JP-T-8-508847

SUMMARY OF THE INVENTION

Problems to be Solved by the Invention

The lead-acid battery has battery characteristics because of the reaction mechanism (high rate discharge, stability in fully charged state). On the other hand, the toxicity of lead and lead compounds and the risk of sulfuric acid have been widely known.

One old example of the lead poisoning from the lead compound is the lead poisoning caused by lead elution from a water pipe containing lead. Because of the toxicity of the lead, it has been prohibited to add an alkyl lead compound, which has been used as an antiknocking agent, to gasoline for prime movers. In an example of electronics industries, lead-free solder comes to be used instead of lead solder that has been widely used. In view of the toxicity of the lead, the restriction of the use of the lead in the electronic devices in accordance with the RoHS Directive is considered inevitable. On the other hand, since the lead-acid battery is excellent in its performance, it is necessary to keep using the lead compounds. For this reason, the lead-acid batteries are still widely used as the power source for motors for starting a prime mover.

The sulfuric acid used as the electrolytic solution of the lead-acid battery, differently from other typical mineral acid, has a very strong dehydrating action and is nonvolatile. Therefore, it has been widely known that the sulfuric acid used as the electrolytic solution of the lead-acid battery causes serious chemical injuries (chemical burn). In short, the lead-acid battery is a storage battery whose active material and electrolytic solution material consist of substances that have a large influence on human body and ecosystem.

On the other hand, Patent Literature 1 discloses the invention regarding a long-life and flexible zinc/manganese dioxide printed battery with the large electromotive force, and a producing method for the same. The printed battery according to Patent Literature 1 is formed in a manner that an anode produced by printing a manganese oxide paste and a cathode formed by printing a zinc paste are stacked through a separator impregnated with an electrolytic solution. In this printed battery, the electrolyte solution contains 2 to 25 wt % of phosphoric acid.

Patent Literature 1 describes the following points regarding the case in which the electrolytic solution contains a phosphoric acid aqueous solution. It has been found out that the initial electromotive force reaches 2 V although a no-load discharge characteristic is not satisfied. In particular, the effect of drastically improving the electromotive force is obtained by adding phosphoric acid to a zinc chloride/ammonia chloride electrolytic solution or a zinc chloride electrolytic solution. Moreover, a printed battery (primary battery) that is also superior in no-load discharge characteristic is obtained.

However, the battery disclosed in Patent Literature 1 is the invention regarding the manganese battery corresponding to one kind of primary batteries. In the battery disclosed in Patent Literature 1, it has been suggested to make zinc chloride and phosphoric acid coexist in the electrolytic solution. Zinc phosphate is insoluble in the electrolytic solution. Therefore, it is estimated that if phosphoric acid is added to the electrolytic solution containing zinc chloride, zinc phosphate is generated and this is precipitated and becomes insoluble. If the chloride salt is used in the electrolytic solution in the battery disclosed in Patent Literature 1, performing charge results in the generation of chlorine gas. This is because chloride ions in the electrolytic solution are oxidized with priority over hydroxide ions generated by dissociation of water included in the electrolytic solution. The generated chlorine gas increases the internal pressure of the battery and may leak out in the end. At the same time, the generated chlorine gas is not ionized again and returned to the electrolytic solution. Therefore, this reaction is irreversible (charge is impossible). Thus, the battery disclosed in Patent Literature 1 is unusable as the secondary battery.

The alkaline battery disclosed in Patent Literature 2 includes the zinc alloy containing aluminum as the negative electrode active material. Specifically, the alkaline battery disclosed in Patent Literature 2 is featured in including phosphoric acid or phosphate ions including alkali salt of phosphate as the electrolytic solution of the gel zinc negative electrode. In the case of the alkaline battery, a potassium hydroxide aqueous solution is usually used as the alkali solution for the electrolytic solution. In the discharge reaction in the positive electrode active material and the negative electrode active material present under the alkali, manganese oxide and zinc oxide with a valence number reduced are generated.

Thus, Patent Literature 1 and Patent Literature 2 merely disclose the improvement of the primary battery and do not describe the function as the secondary battery. The secondary battery that has the performance equivalent to that of the lead-acid battery and includes less, or is free of, the harmful substances such as lead has been required.

Patent Literature 3 describes a rechargeable electrochemical battery including a rechargeable zinc minus electrode, an ion-conductive aqueous electrolyte, and a manganese dioxide.plus electrode. According to Patent Literature 3, the main components of the aqueous electrolyte can be selected particularly from alkali metal hydroxides such as KOH and $H_2SO_4$, acid such as $H_3BO_3$ and $H_3PO_4$, a mixture thereof, a solution of the salt that can form $ZnCl_2$, $NH_4Cl$, NaCl, and KCl, and a mixture thereof. On the other hand, Patent Literature 3 describes that such a battery is usually an alkali manganese dioxide/zinc battery, and describes, as one example, only the alkali manganese dioxide/zinc battery. Therefore, the rechargeable electrochemical battery according to Patent Literature 3 is basically the alkali manganese dioxide/zinc battery containing an alkali component as the aqueous electrolyte. Note that the reaction formula when manganese dioxide is discharged disclosed in Patent Literature 3 is also the reaction formula in the alkali-manganese primary battery that is generally shown.

It is an object of the present invention to provide a secondary battery that includes less lead or is free of lead and has the high electromotive force. Specifically, the present invention provides the secondary battery to be described below. This secondary battery can generate the high electromotive force by the use of an aqueous electrolytic solution. In addition, this secondary battery is a secondary battery that includes less, or is free of, lead compounds and sulfuric acid that have an adverse influence on environment and ecosystem.

Solution to the Problems

The present inventor has conducted earnest studies in order to obtain a battery that includes less, or is free of, harmful substances such as lead and has a structure similar to that of a lead-acid battery and a charge-discharge reaction mechanism similar to that of the lead-acid battery. As a result, the following secondary battery has been found out and the present invention has been completed. This secondary battery employs, instead of lead oxide used for a positive electrode active material, manganese oxide as the similar inorganic oxide oxidant. A negative electrode active material includes base metal or alloy containing base metal. An electrolytic solution to be used includes anions that react with the positive electrode active material or the negative electrode active material, and form a substance that is insoluble in the electrolytic solution. This electrolytic solution may be an electrolytic solution including a phosphoric acid compound corresponding to one kind of inorganic oxoacid and/or an organic oxoacid (examples of the organic oxoacid include p-toluene sulfonic acid, benzene sulfonic acid, p-phenol sulfonic acid, phenyl phosphonic acid, and 5-sulfosalicylic acid). Such a structure enables lead oxide, which has been used as the positive electrode active material of the lead-acid battery, to be replaced by manganese oxide. Thus, the use of the lead compound, which is a harmful substance, can be reduced. In addition, the base metal can also be used in the negative electrode active material instead of the metal lead. Therefore, the secondary battery completely free of lead can be obtained. In the case of using metal zinc or alloy containing zinc or tin or alloy containing tin in the negative electrode, the secondary battery with the electromotive force equivalent to that of the lead-acid battery can be obtained. In addition, this battery is a chargeable and dischargeable secondary battery.

The present inventor has examined the technical requirements for operating the lead-acid battery described above. As a result, the present inventor has found out that manganese oxide is preferable as the metal oxide oxidant with the oxidizing power similar to that of the positive electrode of the lead-acid battery. For example, in the reaction in the case where manganese dioxide functions as the oxidant, tetravalent manganese in the manganese dioxide accepts electrons in the discharge and the valence number thereof becomes four or less and oxygen in the oxide is released. Furthermore, manganese receives directly electrons from an external circuit or a reducing agent. This phenomenon is similar to the phenomenon of lead oxide that is the positive electrode active material in the lead-acid battery. The lead-acid battery operates by the similar mechanism.

However, in the case where manganese oxide is used as the positive electrode active material and sulfuric acid is used as the electrolyte of the electrolytic solution, manganese oxide is dissolved in the sulfuric acid, which is a problem. In order to solve this problem, the present inventor has discovered that phosphoric acid, a phosphate ion or an alkali metal (Li, Na, K) ion, salt including an ammonium ion, or a mixture thereof can be used instead of the sulfuric acid. Moreover, the present inventor has discovered that organic oxoacid such as p-toluene sulfonic acid can be used instead of the sulfuric acid.

In addition, the present inventor has found out that, preferably, the negative electrode active material metal used here is the metal with high hydrogen overvoltage that is capable of electroplating in the aqueous solution and the compound generated by the reaction between this negative electrode active material metal and anions in the electrolytic solution is the compound that is insoluble in the electrolytic solution and precipitated on the electrode surface. Specific candidates are metal manganese, metal tin, metal zinc, metal gallium, metal lead, and alloy containing these. The present inventor has selected a predetermined metal (alloy) from these negative electrode active material candidates and used the selected metal (alloy) in the negative electrode of the battery and performed the discharge reaction in the phosphoric acid aqueous solution. Thus, the present inventor has discovered that the metal (alloy) can, at the same time as being oxidized, precipitate the metal phosphate on the surface of the negative electrode active material. The metal phosphate compound of the metal (alloy) generated on the surface of the negative electrode adheres to the metal surface. It has moreover been discovered that the similar phenomenon is observed when the organic oxoacid (for example, p-toluene sulfonic acid) aqueous solution is used.

That is to say, in order to solve the above problem, the present invention includes the following structures.
(First Aspect)

A first aspect of the present invention is a secondary battery including: a positive electrode including a positive electrode active material containing manganese oxide; a negative electrode including a negative electrode active material containing at least one selected from zinc, gallium, and tin; and an electrolytic solution containing at least one selected from phosphoric acid and organic oxoacid and having a pH of less than 7, wherein the open circuit voltage in a fully charged state is more than 1.6 V.

According to the first aspect of the present invention, the secondary battery with the high electromotive force that includes less lead or is free of lead can be obtained.
(Second Aspect)

A second aspect of the present invention is the secondary battery according to the first aspect, wherein the electrolytic solution has a pH of 5 or less at 25° C.

According to the second aspect of the present invention, the secondary battery with the high electromotive force that includes less lead or is free of lead can be obtained for sure.
(Third Aspect)

A third aspect of the present invention is the secondary battery according to the first or second aspect, wherein the quantity of anions, in the electrolytic solution, that are derived from the phosphoric acid and/or the organic oxoacid is more than the total quantity of the anions that are required for reaction with the positive electrode active material and the negative electrode active material by discharge reaction.

According to the third aspect of the present invention, the secondary battery with the high electromotive force can be obtained for sure because the electrolytic solution contains the predetermined substance. In addition, the anions enough to cause the reaction between the active material on the electrode surface in contact with the electrolytic solution and the anions in the electrolyte are included in the electrolyte. Thus, the secondary battery with high capacity can be obtained.
(Fourth Aspect)

A fourth aspect of the present invention is the secondary battery according to any one of the first to third aspects, wherein the negative electrode active material contains zinc.

According to the fourth aspect of the present invention, the secondary battery with the higher electromotive force can be obtained because the negative electrode active material contains zinc.
(Fifth Aspect)

A fifth aspect of the present invention is the secondary battery according to the fourth aspect, wherein the open circuit voltage in the fully charged state is 2.0 V or more.

According to the fifth aspect of the present invention, an open circuit voltage of 2.0 V or more can be obtained in the fully charged state in the case where the negative electrode active material contains zinc and the predetermined electrolytic solution is included.
(Sixth Aspect)

A sixth aspect of the present invention is the secondary battery according to any one of the first to fifth aspects, wherein the organic oxoacid is at least one selected from p-toluene sulfonic acid, benzene sulfonic acid, p-phenol sulfonic acid, phenyl phosphonic acid, and 5-sulfosalicylic acid.

According to the sixth aspect of the present invention, the operation as the predetermined secondary battery can be surely performed because the organic oxoacid is p-toluene sulfonic acid, benzene sulfonic acid, p-phenol sulfonic acid, phenyl phosphonic acid, and/or 5-sulfosalicylic acid.
(Seventh Aspect)

A seventh aspect of the present invention is the secondary battery according to any one of the first to sixth aspects, wherein the phosphoric acid includes orthophosphoric acid ($H_3PO_4$).

The secondary battery with the high electromotive force can be obtained for sure because the electrolytic solution includes orthophosphoric acid ($H_3PO_4$).
(Eighth Aspect)

An eighth aspect of the present invention is the secondary battery according to any one of the first to seventh aspects, wherein the electrolytic solution further contains phosphate.

Since the electrolytic solution contains phosphate, the pH can be adjusted without decreasing the concentration of the phosphate ions in the electrolytic solution.
(Ninth Aspect)

The battery is the secondary battery according to the eighth aspect, wherein the phosphate is at least one alkali metal phosphate selected from $K_3PO_4$, $Li_3PO_4$, $Na_3PO_4$, and $(NH_4)_2HPO_4$.

Since the electrolytic solution contains the predetermined alkali metal phosphate, the liquidity (for example, pH) of the electrolytic solution that is suitable for the secondary battery can be controlled and the excess reaction of the phosphate with the negative electrode metal can be suppressed.

(Tenth Aspect)

A tenth aspect of the present invention is a device including the secondary battery according to any one of the first to ninth aspects.

By the use of the secondary battery according to the present invention, the device with higher performance can be obtained.

Effects of the Invention

According to the present invention, the secondary battery with the high electromotive force that includes less lead or is free of lead can be obtained. That is to say, the present invention can prove the secondary battery to be described below. This secondary battery can generate the high electromotive force while using the aqueous electrolytic solution. In addition, this secondary battery is the secondary battery that includes less lead compounds and sulfuric acid that have an adverse influence on environment and ecosystem, or is free of those elements (lead-free).

DESCRIPTION OF THE EMBODIMENTS

An embodiment of the present invention is hereinafter described in detail. The following embodiment is an embodiment for carrying out the present invention and does not intend to limit the present invention within the range thereof.

The present invention provides a secondary battery including a positive electrode including a positive electrode active material, a negative electrode including a negative electrode active material, and an electrolytic solution. The positive electrode active material of the secondary battery according to the present invention includes manganese oxide. The negative electrode active material includes at least one selected from zinc, gallium, and tin. The electrolytic solution includes at least one selected from phosphoric acid and organic oxoacid. The electrolytic solution has a pH of less than 7. The open circuit voltage of the secondary battery according to the present invention in a fully charged state is more than 1.6 V.

The secondary battery according to the present invention is a secondary battery with an open circuit voltage as high as over 1.6 V including less lead or being free of lead. Thus, the present invention can provide a safe secondary battery including less lead or being free of lead and including an aqueous electrolytic solution that does not require the use of sulfuric acid.

<Positive Electrode Active Material>

The secondary battery according to the present invention includes the positive electrode including the positive electrode active material. The positive electrode active material contains manganese oxide.

It is not necessarily required that manganese oxide that is used as the positive electrode active material is stoichiometric. The atomic number ratio between manganese and oxygen in the positive electrode active material is not necessarily an integer ratio as long as the manganese oxide functions as a metal oxide oxidant. In general, the metal oxide is not necessarily stoichiometric. Manganese in manganese oxide exhibits various valence numbers. As long as the manganese oxide used as the positive electrode active material functions as the metal oxide oxidant, a part of the manganese element in the manganese oxide may be replaced by another element. If a part of the manganese element in the manganese oxide is replaced by another element as appropriate, this can function as the positive electrode active material of the battery according to the present invention.

The manganese oxide suitably used as the positive electrode active material is preferably manganese dioxide from the viewpoint of electron conductivity. A method for producing manganese dioxide as the positive electrode active material is not limited to a particular method. Examples of the manganese dioxide include chemically synthesized manganese dioxide and electrolytic manganese dioxide. Note that manganese dioxide is used as the positive electrode active material for a manganese dry cell.

As the positive electrode including the positive electrode active material containing manganese dioxide, a metal plate that does not directly contribute to the battery reaction can be used. To the metal plate, a mixture of powder manganese dioxide and polymer binder and/or an auxiliary conductive material (for example, carbon) is applied as appropriate. In addition, the positive electrode can be produced by applying the mixture directly to a current collector of carbon, for example. In a case of producing the positive electrode to which an electrolytic manganese dioxide compound adheres, the positive electrode can be produced in the following manner. In one example, manganese sulfate is dissolved in an aqueous solution that is acidified with sulfuric acid and then, the manganese solution is heated to 70° C. or more and stirred. Next, two carbon bar electrodes are immersed in the manganese solution and between both carbon electrodes, voltage (about 2.0 to 2.5 V) is applied continuously. As a result, on the surface of the carbon electrode with the potential set to a higher side, the electrolytic manganese dioxide with high electron conductivity can be obtained.

<Negative Electrode Active Material>

The secondary battery according to the present invention includes the negative electrode including the negative electrode active material. The negative electrode active material contains at least one selected from zinc, gallium, and tin.

Examples of the negative electrode active material include metal tin, metal gallium, metal zinc, metal manganese, metal lead, and alloy thereof. These metals react with phosphate ions to generate the insoluble salt, and moreover act as a reducing agent as appropriate. In addition, since these are metals, the electron conductivity is excellent. Among these metals, the material containing at least one selected from zinc, gallium, and tin can be preferably used as the negative electrode active material in the secondary battery according to the present invention.

The metal and metal alloy that are preferable as the negative electrode active material can be used as a mixture containing the powder thereof, a vehicle, and an auxiliary conductive material, and the like. Alternatively, a metal plate of the metal and metal alloy that are preferable as the negative electrode active material can be used directly as the negative electrode active material of the negative electrode.

In the secondary battery according to the present invention, the negative electrode active material preferably contains zinc. Since the negative electrode active material contains zinc in the secondary battery according to the present invention, the secondary battery can have higher electromotive force.

In the case where the negative electrode active material contains zinc in the secondary battery according to the present invention, in the fully charged state, an open circuit voltage of 1.85 V or more can be obtained. In the case where the negative electrode active material contains zinc, an open circuit voltage of 2.0 V or more can be obtained depending on the combination with a predetermined charge liquid. Furthermore, in the secondary battery according to the present invention, the negative electrode active material preferably contains only zinc.

In the secondary battery according to the present invention, the negative electrode active material can contain tin. Specifically, simple substance of metal tin, alloy of tin and lead, alloy of tin, silver, and gold, or the like can be used as the negative electrode active material containing tin. In the case where the negative electrode active material is the alloy of tin and lead, the lead is contained by preferably 50 wt % or less and more preferably 40 wt % or less. If the lead is contained by a predetermined quantity or less, the use of the lead in the secondary battery can be reduced. In addition, in the case where the negative electrode active material is the alloy of tin, silver, and gold, the secondary battery free of lead can be obtained.

<Shape of Positive Electrode and Negative Electrode>

The positive electrode including the positive electrode active material and the negative electrode including the negative electrode active material preferably have as large specific surface area as possible. In the reaction of the secondary battery according to the present invention, which is different from the reaction of the primary battery including manganese oxide in the positive electrode by dissolving of the negative electrode metal, the surface of each active material is covered with the reaction product with anions in the electrolytic solution as the discharge is advanced. As a result, the electrode surface is covered with the reaction product having poor electron conductivity, and thus, the battery may have higher internal resistance. The similar phenomenon is also seen in the lead-acid battery. In order to increase the electrode surface area per unit volume (per unit weight) of the electrode, the powder active material with large specific surface area can be used. In addition, by increasing the surface area through chemical etching or the like for the surface of the active material, the electrode surface area can be increased.

<Electrolytic Solution>

The secondary battery according to the present invention includes the electrolytic solution. The electrolytic solution includes phosphoric acid or organic oxoacid. Examples of the organic oxoacid include p-toluene sulfonic acid, benzene sulfonic acid, p-phenol sulfonic acid, phenyl phosphonic acid, and/or 5-sulfosalicylic acid.

In the case where sulfuric acid is used as the electrolytic solution in the battery including the manganese oxide used as the positive electrode active material like in the lead-acid battery, manganese sulfate generated in the reaction between sulfate ions and the positive electrode active material is easily dissolved in sulfuric acid. In addition, this manganese sulfate also reacts with the metal that is the negative electrode active material and the material that is soluble is easily generated. Therefore, in the case where sulfuric acid is used as the electrolytic solution, the battery fails to function as the secondary battery. This phenomenon similarly occurs when nitric acid or chloric acid is used as the electrolytic solution. Since nitric acid and chloric acid easily dissolve the negative electrode metal in particular, the battery does not function as the secondary battery if such an electrolytic solution is used. The electrolytic solution of the secondary battery according to the present invention includes phosphate ions and is acid (pH<7). Thus, the manganese phosphate compound that is insoluble in the electrolytic solution in the discharge reaction can be generated on the surface of the positive electrode. Therefore, the secondary battery according to the present invention can operate as the secondary battery for sure.

In the case of the lead-acid battery, the lead in both electrodes reacts with the sulfate ions in the electrolytic solution by the discharge reaction. The generated lead sulfate is insoluble in the electrolytic solution. Usually, many phosphate ions generate the insoluble salt through the reaction with the metal ions. This similarly applies to the manganese oxide that is used in the positive electrode according to the present invention and the negative electrode metal or alloy that is used for the negative electrode according to the present invention. When lead sulfate is generated from the discharge reaction of both electrode active materials ($PbO_2$, Pb) in the discharge reaction of the lead-acid battery, the concentration of sulfate ions in the electrolytic solution decreases and the electrolyte specific gravity decreases. In addition, in the discharge reaction, not all the active materials can contribute to the discharge reaction unless more sulfate ions are contained than the sum of the total quantity of sulfate ions that react with $PbO_2$ in the positive electrode active material of the lead-acid battery and the total quantity of sulfate ions that react with lead in the negative electrode active material. In this case, the increase in pH of the electrolyte and the drastic voltage drop of the lead-acid battery occur. Therefore, the lead-acid battery includes sulfate ions enough to react with both active materials in the discharge reaction or excess sulfate ions for the reaction with both active materials.

In the secondary battery according to the present invention, anions in the electrolytic solution, for example phosphate ions, react with both electrode active materials by the discharge reaction and the insoluble salt adheres to the active materials. That is to say, similarly to the discharge mechanism of the lead-acid battery, the concentration of phosphate ions in the electrolyte decreases by the discharge reaction. Thus, in order to cause the battery according to the present invention to function properly, the electrolytic solution needs to include the phosphate ions by more than or equal to the total quantity of phosphate ions that react with the positive electrode active material and the negative electrode active material in the discharge similarly to the lead-acid battery.

Either in $PbO_2$ used in the positive electrode active material of the lead-acid battery or $MnO_2$ used in the secondary battery according to the present invention, the equilibrium potential with the metal ion ($PbO_2/Pb^{2+}$ and $MnO_2/Mn^{2+}$, respectively) depends on the pH of the electrolytic solution with which these are impregnated. In the lead-acid battery and the secondary battery according to the present invention, the equilibrium potential is higher as the pH of the electrolytic solution is lower. Therefore, the secondary battery that generates the high voltage can be produced. However, in the case where the pH of the electrolytic solution is low and the voltage of the secondary battery is high in the design, the voltage required in the charge is also high. On the other hand, the electrolysis of water in the electrolytic solution advances more drastically by the charge reaction. Therefore, decreasing the pH of the electrolytic solution and increasing the voltage of the secondary battery do not necessarily achieve the charge with high coulombic efficiency. The coulombic efficiency herein described means the ratio of the charges used in oxidizing the positive electrode active material to the charges input to the secondary battery for the charge. In the case where all the charges are used in oxidizing the positive electrode active material, the coulombic efficiency is 100%. In the secondary battery with an electromotive force of 1.23 V or more including the electrolytic solution containing water, a part of the charges input to the battery in the charge is used for the electrolysis of the water. Therefore, in the secondary battery including the electrolytic solution containing water, the coulombic efficiency is generally not 100%.

In the case of the lead-acid battery, the sulfuric acid solution that is strong acid is used. Therefore, in the case of producing the battery that generates the desired voltage, the electromotive force can be controlled only by changing the concentration of sulfuric acid in the electrolytic solution. In the lead-acid battery, however, the sulfate ions in the electrolytic solution are consumed as the discharge reaction is advanced; therefore, the pH of the electrolytic solution increases. As the pH of the electrolytic solution increases in accordance with the discharge, the electromotive force of the lead-acid battery decreases as the discharge is advanced because of the aforementioned reason.

On the other hand, in the case of the battery according to the present invention, by the use of the electrolytic solution in which phosphoric acid and phosphate are mixed at a predetermined ratio, the pH can be adjusted without decreasing the phosphate ion concentration in the electrolytic solution. As a result, the secondary battery that operates at the voltage where the electrolysis of the water in the electrolytic solution can be suppressed can be designed. The mixed aqueous solution of phosphoric acid and phosphate has a buffering operation. Therefore, in the case of using the mixed aqueous solution of phosphoric acid and phosphate in the secondary battery according to the present invention, the increase in pH of the electrolytic solution can be suppressed even if the phosphate ions in the electrolytic solution are consumed by the reaction between phosphate ions in the electrolytic solution and the active materials of both electrodes in the discharge reaction. Accordingly, in the secondary battery according to the present invention, the decrease in battery voltage in the discharge can be suppressed. Furthermore, by adjusting the mixing ratio between phosphoric acid and phosphate, the desired pH and ion concentration can be achieved. As a result, the adjustment for achieving the desired freezing temperature is also easy.

Furthermore, in the case of the battery according to the present invention, a phosphoric acid solution or organic oxoacid can be used as the electrolytic solution. In the case of using the phosphoric acid solution or the organic oxoacid as the electrolytic solution, a dehydrating action for the organic substances, which may occur in the concentrated sulfuric acid used in the electrolytic solution of the lead-acid battery, does not occur. Therefore, in the case of the battery according to the present invention, as a method of controlling the freezing temperature of the electrolytic solution, an organic compound such as glycols, alcohols, and glycerins with an action of decreasing the freezing point can coexist in the electrolytic solution.

Both electrode active materials and the anions in the electrolyte react with each other to produce the insoluble salt by the discharge reaction, and by the mechanism based on this operation principle of the lead-acid battery, the secondary battery according to the present invention has been made. Therefore, any electrolytic solution including the anions that satisfy the condition can be used as the electrolytic solution of the secondary battery according to the present invention. By using either organic or inorganic oxoacid as the electrolytic solution, the secondary battery according to the present invention can be formed. As the organic oxoacid aqueous solution, the aqueous solution of p-toluene sulfonic acid, benzene sulfonic acid, p-phenol sulfonic acid, phenyl phosphonic acid, 5-sulfosalicylic acid, or the like can be used.

The pH of the electrolytic solution of the secondary battery according to the present invention is less than 7. The pH of the electrolytic solution of the secondary battery according to the present invention is preferably 5 or less and more preferably 4 or less.

In the secondary battery according to the present invention, the pH of the electrolytic solution is less than 7, preferably 5 or less, and more preferably 4 or less, and thus, the insoluble salt is generated by the reaction between phosphate ions and manganese. Therefore, when the pH of the electrolytic solution is in the predetermined range, the secondary battery with the high electromotive force that includes less lead or is free of lead can be obtained for sure. On the other hand, if the pH is 7 or more, hydroxylation is advanced with priority over phosphorylation of the manganese oxide in the positive electrode active material. Therefore, the reaction that is intended in the present invention does not occur.

The phosphoric acid that is used in the electrolytic solution may be either one of or both the orthophosphoric acid ($H_3PO_4$) and polyphosphoric acid. The electrolytic solution that is employed may include phosphate other than phosphoric acid. As the phosphate included in the electrolytic solution, at least one kind selected from salt including a phosphate ion and alkali metal, for example, hydrogen phosphate compounds including potassium phosphate compounds (such as $K_3PO_4$, $KH_2PO_4$, and $K_2HPO_4$), sodium phosphate compounds (such as $Na_3PO_4$, $NaH_2PO_4$, and $Na_2HPO_4$), lithium phosphate compounds (such as $Li_3PO_4$ and $LiH_2PO_4$), potassium hydrogen phosphate (such as $KH_2PO_4$ and $K_2HPO_4$), sodium hydrogen phosphate (such as $NaH_2PO_4$ and $Na_2HPO_4$), and lithium phosphate ($LiH_2PO_4$). Alternatively, the salt of an ammonium ion and a phosphate ion, for example at least one kind selected from ammonium dihydrogenphosphate (($NH_4)_2HPO_4$) and diammonium hydrogenphosphate (($NH_4)H_2PO_4$) may be included. In addition to those above, in order to adjust the pH of the electrolyte solution so as to obtain the battery with the necessary voltage, the electrolytic solution including a K ion, a Na ion, a Li ion, an ammonium ion, or the like with high alkalinity can be used. By adding these alkali metal ions and ammonium ions to the electrolytic solution, the liquidity (for example, pH) of the electrolytic solution that is suitable for the secondary battery according to the present invention can be controlled and the excess reaction of the phosphate in the electrolytic solution with the negative electrode metal can be suppressed.

It is preferable that the halogen ions are not included in the electrolytic solution that is used in the present battery. In general, the oxoacid ion has higher ionization tendency and the halogen ion has lower ionization tendency than the hydroxide ion in the aqueous electrolytic solution. That is to say, in the case where the halogen ions are included in the electrolytic solution, the power is consumed to oxidize the halogen ions in the electrolytic solution on the surface of the electrode on the positive electrode side in the charge of the battery. Therefore, the high coulombic efficiency cannot be achieved and moreover, the corrosive halogen gas is generated and the internal voltage of the battery is increased. If the electrolytic solution includes only the hydroxide ion and the oxoacid ion as the anion, the ionization tendency of the hydroxide ion is lower than that of the oxoacid ion. Thus, the oxoacid ion is not oxidized and the hydroxide ion is oxidized and oxygen is generated. As a saline solution is electrolyzed, chlorine gas is generated from the electrode on the higher voltage side. On the other hand, electrolyzing a dilute sulfuric acid aqueous solution generates oxygen from the higher side electrode and does not generate the product resulting from the electric oxidization of the sulfate ion and this is because of the aforementioned reason. In the case where oxygen is generated, oxygen and hydrogen generated on the negative electrode side are subjected to reaction by the burning catalyst (catalyst plug) and this reaction can make the resulting water return to the electrolytic solution. However, it is difficult to return the halogen gas generated in the positive electrode back to the ion and the constancy of the electrolytic solution is not maintained. This similarly applies to the secondary battery according to the present invention. That is to say, if the halogen ion is contained in the electrolytic solution, a part of the charge power is used to oxidize the halogen ion. This results in the decrease in coulombic efficiency and the irreversibility. In view of this, in the secondary battery according to the present invention, it is preferable to use the electrolytic solution containing as few halogen ions as possible technically.

<Battery Cell>

In the secondary battery, unit cells each including a pair of positive electrode and negative electrode can be connected in series and parallel in order to obtain predetermined voltage and current. The unit cell in this case is herein also referred to as a battery cell.

The structure of the battery cell in the secondary battery according to the present invention may be similar to that of the battery cell of the lead-acid battery. In the reaction in the secondary battery according to the present invention, the anion in the electrolytic solution reacts with the positive electrode active material and the negative electrode active material as the discharge reaction is advanced, and each active material becomes a phosphate compound or an organic oxoacid compound. Therefore, in the discharge reaction of the secondary battery according to the present invention, the anion concentration in the electrolytic solution decreases and water is generated from the positive electrode. The secondary battery according to the present invention requires the electrolytic solution enough for the battery according to the present invention to function properly even if the phosphoric acid concentration or the organic oxoacid concentration in the electrolytic solution decreases due to the generation of water in the discharge reaction.

In the secondary battery according to the present invention, the product generated in the discharge reaction remains on the surface of each electrode, similarly to the lead-acid battery. Therefore, the secondary battery according to the present invention functions as the battery without the necessity of separating the electrolytic solution between the positive electrode and the negative electrode with the use of the separator or the like. However, in the practical application, it is preferable to provide the separator or the like in the electrolytic solution between the positive electrode and the negative electrode in order to prevent the reaction product from falling from the electrode surface due to the vibration applied to the secondary battery and prevent the positive electrode and the negative electrode from short-circuiting physically or electrically because of the vibration.

In the case of the secondary battery according to the present invention, the separator is disposed for the purpose of preventing the short-circuiting between the positive and negative electrodes or preventing the active material from separating from the electrode plate. Therefore, in the case where the distance between the electrodes is enough to prevent the short-circuiting between the positive electrode and the negative electrode without the separator or where the active material is kept in close contact with the current collector electrode and the separation is prevented without the separator, the use of the separator is not necessarily required.

The secondary battery according to the present invention can generate the voltage higher than the electrolysis voltage (1.23 V) of water. Therefore, particularly in the charge, hydrogen gas or oxygen gas may generate on the surface of each electrode. This phenomenon is also observed in the lead-acid battery. In the commercially available lead-acid battery, the sealed structure is often employed. In order to suppress the increase in internal pressure of the battery cell because of the generated hydrogen and oxygen, the burning catalyst may be disposed in the battery cell. The burning catalyst used in the lead-acid battery is usually referred to as a catalyst plug. Specific examples of the burning catalyst include metal precipitated by reducing or sintering a noble metal component (ion of platinum or palladium, for example) adsorbed in the highly dispersed state on the surface of an alumina carrier with a large specific surface area. In order to burn hydrogen gas and oxygen gas that are generated in the charge and discharge of the secondary battery according to the present invention or generated naturally, a burning catalyst can be provided in the battery cell similarly to the burning catalyst used in the lead-acid battery. By the use of the burning catalyst, oxygen gas and hydrogen gas that are generated by the electrolysis similarly to the lead-acid battery are converted into water. The internal pressure in the battery cell can be kept constant and the breakage of the battery cell and the secondary battery due to the increase in internal pressure can be prevented.

<Reaction Mechanism of Secondary Battery According to the Present Invention>

The battery drawing of the secondary battery according to the present invention is considered based on the reaction mechanism shown below. In the battery diagram, "aq" means the aqueous solution. This applies similarly to the description below. In the example to be described below, the $H_3PO_4$ aqueous solution, the $K_3PO_4$ aqueous solution, and the $Na_3PO_4$ aqueous solution are used as the electrolytic solution. In the secondary battery according to the present invention, the aqueous solution of the salt including other alkali cation (for example, lithium ion and ammonium ion) and the phosphate ion can be used as the electrolytic solution.

Battery diagram: (−) negative electrode metal or alloy |($H_3PO_4$aq, $K_3PO_4$aq, or $Na_3PO_4$aq) |$MnO_2$, C or M (+)

(M is current collector metal)
(a) Reaction in discharge (when metal zinc is used as the negative electrode active material and phosphoric acid is used as the electrolytic solution)

Positive electrode: $3MnO_2 + nH_3PO_4 + 6H^+ + 6e^- \rightarrow Mn_3H_{(3n-6)}(PO_4)_n + 6H_2O$ Negative electrode: $3Zn + mH_3PO_4 \rightarrow Zn_3H_{(3m-6)}(PO_4)_m + 6H^+ + 6e^-$ (each of n and m is a positive numeral of 2 or more)
(b) Reaction in charge (when metal zinc is used as the negative electrode active material and phosphoric acid is used as the electrolytic solution)

Positive electrode: $Mn_3H_{(3n-6)}(PO_4)_n + 6H_2O \rightarrow 3MnO_2 + nH_3PO_4 + 6H^+ + 6e^-$ Negative electrode: $Zn_3H_{(3m-6)}(PO_4)_m + 6H^+ + 6e^- \rightarrow 3Zn + mH_3PO_4$ (each of n and m is a positive numeral of 2 or more)

Described below is the point different from the conventional battery in the chemical change of the positive and negative electrode active materials in the charge-discharge reaction of the secondary battery according to the present invention.

<Difference from Manganese Dry Cell (Primary Battery)>

The manganese dry cell is the primary battery including manganese dioxide in the positive electrode active material, metal zinc in the negative electrode active material, and ammonium chloride or zinc chloride in the electrolyte. The battery diagram and the discharge reaction of this battery are shown by the following reaction formula:

Battery diagram: (−) Zn|$ZnCl_{2aq}$, $NH_4Cl$aq|$MnO_2$, C(+)

The reaction of the negative electrode in the discharge is as follows.
(pH ranges from 5.1 to 5.8)

$Zn + 2NH_4Cl \rightarrow ZnCl_2 + 2NH_4^+ + 2e^-$ (Zn dissolving)

(pH ranges from 5.8 to 7.9)

$Zn + 2NH_4Cl + 2H_2O \rightarrow Zn(NH_3)_2 \cdot Cl_2 + 2H_3O^+ + 2e^-$ (Zn depositing)

(pH ranges from 7.9 to 9.3)

$Zn + 4NH_4Cl + 4H_2O \rightarrow Zn(NH_3)_4 \cdot Cl_2 + 4H_3O^+ + 4e^-$ (Zn dissolving)

On the other hand, in manganese dioxide (hereinafter referred to as $MnO_2$) as the positive electrode, the hydrogen ion separated from $NH_4^+$ or $H_3O^+$ diffuses in manganese dioxide and in this diffusion, the ion reacts with $MnO_2$ to cause the following reaction:

$MnO_2 + NH_4^+ + e^- \rightarrow MnO(OH) + NH_3$ $MnO_2 + H_3O^+ + e^- \rightarrow MnO(OH) + H_2O$ $MnO(OH) + 3H^+ + e^- \leftrightarrow Mn^{2+} + 2H_2O$ In either case, the metal compound that is generated in the positive electrode in the discharge reaction is MnO(OH) and the total reaction formula in the discharge is as follows:

$2MnO_2 + 2NH_4Cl + Zn \rightarrow 2MnO(OH) + Zn(NH_3)_2 \cdot Cl_2$

Alternatively, the reaction formula in the manganese battery containing much zinc chloride in the electrolytic solution is:

$8MnO_2 + 8H_2O + ZnCl_2 + 4Zn \rightarrow 8MnO(OH) + ZnCl_2 \cdot Zn(OH)_2$

This manganese battery includes the reaction mechanism different from that of the secondary battery according to the present invention.

As described above, the electrolytic solution of the manganese dry cell includes a chloride ion. Therefore, the manganese battery remains as the primary battery. Performing charge oxidizes the chloride ion to produce gas, causing the battery to swell internally.

<Difference from Alkali-Manganese Dry Cell (Primary Battery)>

The alkali-manganese dry cell is the primary battery including manganese dioxide in the positive electrode active material, metal zinc in the negative electrode active material, and sodium hydroxide in the electrolyte. The battery diagram and the discharge reaction of this battery are shown by the following reaction formula:

Battery diagram: (−) Zn|NaOHaq|$MnO_2$, C (+)

(Reaction of Negative Electrode in Discharge)

$Zn + 2OH^- \rightarrow ZnO + H_2O + 2e^-$ (Reaction of Positive Electrode in Discharge)

$2MnO_2 + H_2O + 2e^- \rightarrow Mn_2O_3 + 2OH^-$

In the alkali-manganese dry cell, manganese dioxide in the positive electrode supplies an oxygen ion to the water in the electrolytic solution and two hydroxide ions are generated in the reaction. Thus, the reaction mechanism of the alkali-manganese dry cell is different from the reaction mechanism of the secondary battery according to the present invention.

In the case of the manganese dry cell as described above, $MnO_2$ in the positive electrode changes into MnO(OH)↔$Mn^{2+}$ by the discharge reaction. In the case of the alkali-manganese dry cell, moreover, $MnO_2$ in the positive electrode changes into $Mn_2O_3$ or MnO(OH) by the discharge reaction. On the other hand, in the case of the secondary battery according to the present invention, $MnO_2$ in the positive electrode changes into a composite oxide including manganese-phosphoric acid by the discharge reaction. Thus, it is understood that the battery according to the present invention includes the reaction mechanism different from that of the existing chemical battery.

<Electromotive Force of Secondary Battery According to the Present Invention>

The voltage that can be generated by each secondary battery can be theoretically calculated by thermochemical calculation.

In the case of using manganese oxide in the positive electrode active material and metal zinc in the negative electrode active material, the electromotive force can be obtained by converting the Gibbs energy change of the entire reaction system in the discharge reaction into the expression of the electrochemical voltage. That is to say, the theoretical electromotive force is expressed by the following expression.

$E = -\Delta G/(n \cdot F)$ (In the expression, E represents the theoretical electromotive force, $-\Delta G$ represents the Gibbs energy change of the entire battery in the discharge reaction, n is the number of reaction electrons, and F represents the Faraday constant.)

The reason why the secondary battery according to the present invention can generate higher electromotive force than the manganese primary battery (electromotive force: about 1.5 V) is described below. That is to say, the substance that is generated on the positive electrode side in the discharge reaction of the manganese primary battery is manganese hydroxide. On the other hand, in the case of the secondary battery according to the present invention, a manganese phosphate compound is generated. The substance that is generated in the negative electrode is a zinc compound formed by an ammonium ion and a chloride ion in the case of the manganese primary battery and is a phosphate compound in the case of the secondary battery according to the present invention. It is considered that because of the difference in Gibbs energy change quantity due to the aforementioned difference, the secondary battery according to the present invention can generate the high electromotive force. In addition, this phenomenon can be estimated also from the Pourbaix diagram (E-pH diagram) of manganese.

The molar mass of the metal lead that is used in the negative electrode active material of the lead-acid battery is usually large (207.2 g/mol). The specific gravity of the metal lead is about 11.34 g/cm$^3$ at around room temperature and this value is larger than that of other metal. The molar mass of the lead oxide (as PbO$_2$) as the positive electrode active material is 239.2 g/mol and the specific gravity is about 9.7 g/cm$^3$.

On the other hand, in the secondary battery according to the present invention, in the case of using the metal zinc as the negative electrode active material and manganese dioxide as the positive electrode active material, the molar mass of the metal zinc is 65.4 g/mol and the molar mass of the mass of the manganese dioxide is 86.9 g/mol. The molar mass of tin is 118.7 g/mol, which is lighter than that of lead. The specific gravity of zinc is 7.1 g/cm$^3$ and that of β tin is 7.4 g/cm$^3$. Therefore, the secondary battery according to the present invention has an advantage of high performance and small weight over the lead-acid battery.

The present invention provides a device including the secondary battery according to the present invention described above. The term "device" herein described includes electronic devices, electric machines, motor devices, and the like. The electronic devices, electric machines, motor devices, and the like including the secondary battery according to the present invention can have higher performance.

EXAMPLES

The present invention is hereinafter described in detail with reference to Examples; however, the present invention is not limited to Examples below.

Secondary batteries were obtained each by using a negative electrode including an electrolytic solution and a negative electrode active material shown in Tables 1 and 2. As a positive electrode active material as a positive electrode, manganese dioxide prepared as below was used.
(Preparation of Electrode Including Positive Electrode Active Material)

Figure 2:
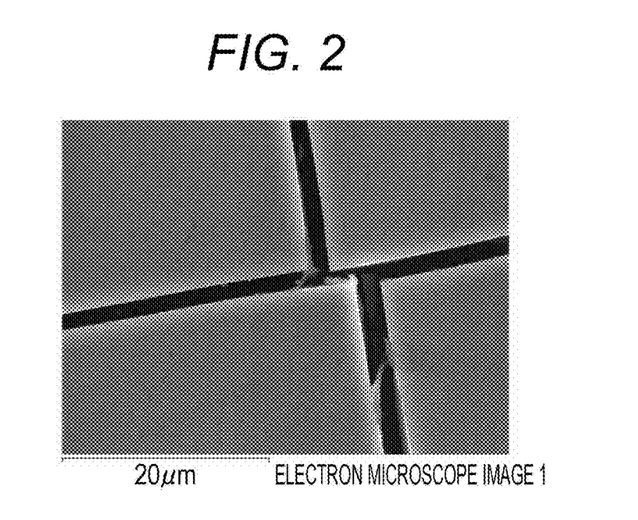
FIG. 2 is a scanning electron microscope (SEM) image of a surface of a carbon electrode covered with manganese dioxide that is used in Example of the present invention before discharge.
Figure 3:
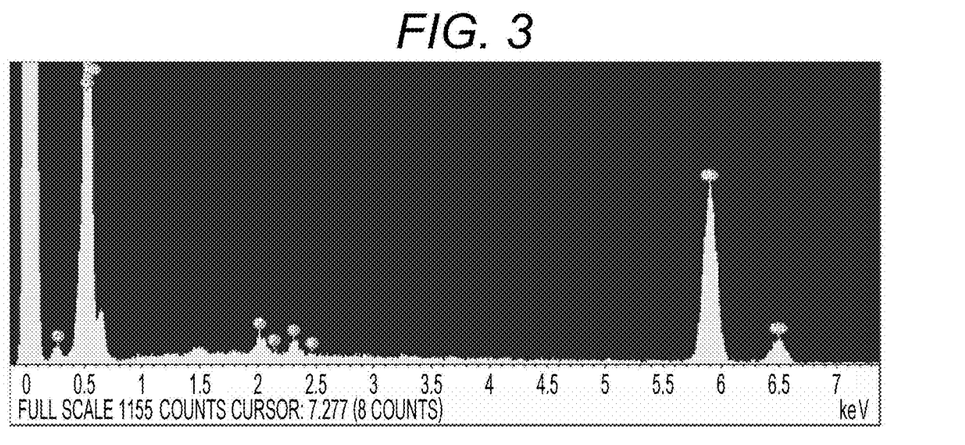
FIG. 3 shows results of surface analysis of the carbon electrode covered with manganese dioxide that is used in Example of the present invention before discharge in accordance with an energy dispersive X-ray spectroscopy device (EDS)

An electrode including the positive electrode active material was produced in the following manner. That is to say, manganese sulfate was dissolved with heat into 1 mol/L (2 N) of sulfuric acid aqueous solution so that the concentration became 1 mol/L. The manganese sulfate-dilute sulfuric acid aqueous solution that has been dissolved with heat was maintained at constant temperature of 75° C., two carbon bar electrodes were immersed in the solution, the amount of current flowing to the electrodes was maintained at 0.01 A, and this state was kept for 10 minutes. The voltage between the electrodes here was 2.0 to 2.5 V. It has been confirmed that hydrogen was generated from the electrode with the lower potential. After the electrolysis for 10 minutes was over, the electrode with the higher potential was extracted from the manganese sulfate-dilute sulfuric acid aqueous solution and cleaned repeatedly and sufficiently with distilled water. After that, in order to remove moisture further, drying was performed at 120° C. for 30 minutes and thus, a carbon electrode bar covered with manganese oxide was obtained. The weight of the covering manganese oxide was calculated from the difference in weight of the carbon bar before and after the electrolytic precipitation. On the basis of this calculation, the experiment was performed using only the electrode in which the manganese dioxide precipitated on the higher-side carbon electrode surface had a weight in the range of 1.0 mg±0.2 mg. FIG. 2 shows results of observing the surface of the carbon electrode covered with the manganese dioxide obtained as above with a scanning electron microscope (hereinafter "SEM"). In addition, FIG. 3 shows results of analyzing the manganese element and the oxygen element on the electrode surface by using an energy dispersive spectroscopy device (hereinafter "EDS"). The results indicate that the film of manganese dioxide is generated on the carbon electrode.
(Electrolytic Solution)

As the electrolytic solution, the following electrolytic solutions A to Z, α, β, and γ were used.

The electrolytic solutions used in this examination were a phosphoric acid solution obtained by diluting commercial 84 wt % phosphoric acid, and a solution in which an aqueous solution (1 mol/L) of phosphate (K$_3$PO$_4$, Li$_3$PO$_4$, Na$_3$PO$_4$, or (NH$_4$)$_2$HPO$_4$) is mixed with the phosphoric acid solution at a predetermined weight ratio. In addition, organic oxoacid (p-toluene sulfonic acid, benzene sulfonic acid, p-phenol sulfonic acid, phenyl phosphonic acid, or 5-sulfosalicylic acid) was also used. For comparison, a potassium hydroxide aqueous solution (1 mol/L or 15 mol/L) and a sodium hydroxide aqueous solution (1 mol/L or 15 mol/L) were also used. Specifically, the following electrolytic solutions A to Z, α, β, and γ were used. For the pH measurement of the prepared electrolytic solution, a pH meter (model PH81) of Yokogawa Electric Corporation with proper calibration was used. The pH of any electrolytic solution was measured in the condition of 25° C.

The electrolytic solutions A to I are shown below.

Electrolytic solution A: 42 wt % phosphoric acid (H$_3$PO$_4$) aqueous solution, pH 1.24

Electrolytic solution B: 16.8 wt % phosphoric acid (H$_3$PO$_4$) aqueous solution, pH 1.31

Electrolytic solution C: 8.4 wt % phosphoric acid (H$_3$PO$_4$) aqueous solution, pH 1.36

Electrolytic solution D: 42 wt % phosphoric acid (H$_3$PO$_4$) aqueous solution+1 mol/L tripotassium phosphate aqueous solution (mixed aqueous solution containing those solutions at a weight ratio of 2:1), pH 1.39

Electrolytic solution E: 16.8 wt % phosphoric acid (H$_3$PO$_4$) aqueous solution+1 mol/L tripotassium phosphate (K$_3$PO$_4$) aqueous solution (mixed aqueous solution containing those solutions at a weight ratio of 2:1), pH 2.19

Electrolytic solution F: 8.4 wt % phosphoric acid ($H_3PO_4$) aqueous solution+1 mol/L tripotassium phosphate ($K_3PO_4$) aqueous solution (mixed aqueous solution containing those solutions at a weight ratio of 2:1), pH 4.13

Electrolytic solution G: 1 mol/L potassium hydroxide (KOH) aqueous solution, pH 14.19

Electrolytic solution H: 15 mol/L potassium hydroxide (KOH) aqueous solution (pH was unmeasurable because electrolyte was contained at high concentration)

Electrolytic solution I: 0.5 mol/L organic oxoacid (p-toluene sulfonic acid) aqueous solution, pH 1.48

As the electrolytic solutions, moreover, the following electrolytic solutions J to Z, α, β, and γ were used.

Electrolytic solution J: sodium hydroxide (NaOH) aqueous solution (1 mol/L), pH 14.7

Electrolytic solution K: sodium hydroxide (NaOH) aqueous solution (15 mol/L), (pH was unmeasurable because electrolyte had high concentration).

Electrolytic solution L: phosphoric acid ($H_3PO_4$) aqueous solution (42 wt %)+phosphate $Na_3PO_4$ aqueous solution (1 mol/L) (mixed aqueous solution containing those solutions at a weight ratio of 2:1), pH 1.73

Electrolytic solution M: phosphoric acid ($H_3PO_4$) aqueous solution (16.8 wt %)+phosphate $Na_3PO_4$ aqueous solution (1 mol/L) (mixed aqueous solution containing those solutions at a weight ratio of 2:1), pH 2.24

Electrolytic solution N: phosphoric acid ($H_3PO_4$) aqueous solution (8.4 wt %)+phosphate $Na_3PO_4$ aqueous solution (1 mol/L) (mixed aqueous solution containing those solutions at a weight ratio of 2:1), pH 4.76

Electrolytic solution O: phosphoric acid ($H_3PO_4$) aqueous solution (42 wt %)+phosphate [$(NH_4)_2HPO_4$] aqueous solution (1 mol/L) (mixed aqueous solution containing those solutions at a weight ratio of 2:1), pH 1.59

Electrolytic solution P: phosphoric acid ($H_3PO_4$) aqueous solution (16.8 wt %)+phosphate [$(NH_4)_2HPO_4$] aqueous solution (1 mol/L) (mixed aqueous solution containing those solutions at a weight ratio of 2:1), pH 1.95

Electrolytic solution Q: phosphoric acid ($H_3PO_4$) aqueous solution (8.4 wt %)+phosphate [$(NH_4)_2HPO_4$] aqueous solution (1 mol/L) (mixed aqueous solution containing those solutions at a weight ratio of 2:1), pH 2.44

Electrolytic solution R: organic oxoacid (benzene sulfonic acid) aqueous solution (1 mol/L), pH 1.45

Electrolytic solution S: organic oxoacid (p-phenol sulfonic acid) aqueous solution (0.5 mol/L), pH 1.49

Electrolytic solution T: organic oxoacid (phenyl phosphonic acid) aqueous solution (0.2 mol/L), pH 1.56

Electrolytic solution U: organic oxoacid (5-sulfosalicylic acid) aqueous solution (1 mol/L), pH 1.43

Electrolytic solution V: phosphoric acid ($H_3PO_4$) aqueous solution (8.4 wt %)+phosphate ($Li_3PO_4$) aqueous solution (1 mol/L) (mixed aqueous solution containing those solutions at a weight ratio of 2:1), pH 3.32

Electrolytic solution W: phosphoric acid ($H_3PO_4$) aqueous solution (8.4 wt %)+organic oxoacid (phenyl phosphonic acid, 0.2 mol/L) (aqueous solution obtained by adding organic oxoacid to a phosphoric acid aqueous solution with a predetermined concentration so that a predetermined concentration is obtained), pH 1.51

Electrolytic solution X: phosphoric acid ($H_3PO_4$) aqueous solution (8.4 wt %)+phosphate [$(NH_4)_2HPO_4$] aqueous solution (1 mol/L)+organic oxoacid (phenyl phosphonic acid, 0.2 mol/L), (aqueous solution obtained by adding organic oxoacid to a mixed aqueous solution containing the phosphoric acid aqueous solution and the phosphate aqueous solution at a weight ratio of 2:1 so that a predetermined concentration is achieved), pH 2.26

Electrolytic solution Y: phosphoric acid ($H_3PO_4$) aqueous solution (16.8 wt %)+phosphate ($Li_3PO_4$) aqueous solution (1 mol/L)+organic oxoacid (phenyl phosphonic acid, 0.2 mol/L), (aqueous solution obtained by adding the organic oxoacid to a mixed aqueous solution containing the phosphoric acid aqueous solution and the phosphate aqueous solution at a weight ratio of 2:1 so that a predetermined concentration is achieved), pH 1.93

Electrolytic solution Z: phosphoric acid ($H_3PO_4$) aqueous solution (8.4 wt %)+phosphate ($Li_3PO_4$) aqueous solution (1 mol/L)+organic oxoacid (phenyl phosphonic acid, 0.2 mol/L), (aqueous solution obtained by adding organic oxoacid to a mixed aqueous solution containing the phosphoric acid aqueous solution and the phosphate aqueous solution at a weight ratio of 2:1 so that a predetermined concentration is achieved), pH 2.42

Electrolytic solution α: phosphoric acid ($H_3PO_4$) aqueous solution (8.4 wt %)+phosphate ($K_3PO_4$) aqueous solution (1 mol/L)+organic oxoacid (phenyl phosphonic acid, 0.2 mol/L), (aqueous solution obtained by adding the organic oxoacid to a mixed aqueous solution containing the phosphoric acid aqueous solution and the phosphate aqueous solution at a weight ratio of 2:1 so that a predetermined concentration is achieved), pH 2.77

Electrolytic solution β: phosphoric acid ($H_3PO_4$) aqueous solution (16.8 wt %)+phosphate [$(NH_4)_2HPO_4$] aqueous solution (1 mol/L) (mixed aqueous solution containing those solutions at a weight ratio of 1:1), pH 1.95

Electrolytic solution γ: phosphoric acid ($H_3PO_4$) aqueous solution (0.84 wt %)+phosphate $K_3PO_4$ aqueous solution (1 mol/L) (mixed aqueous solution containing those solutions at a weight ratio of 1:1), pH 7.27

(Negative Electrode Active Material)

Tables 1 and 2 show the negative electrode active materials used in Examples and Comparative examples. In Tables 1 and 2, "Zn" means metal zinc (Zn). The negative electrode of the metal zinc was formed by cutting a commercial zinc plate (t=0.5 mm) into a strip shape. The strip had a width of 5 mm. In Table 1, "Pb—Sn" is the alloy formed of 68 wt % of lead (Pb) and 32 wt % of tin (Sn). This alloy is commercial eutectic solder with a diameter φ of 1.0 mm. In Table 1, "Sn—Ag—Au" is the alloy formed of 96.5 wt % of tin (Sn), 3 wt % of silver (Ag), and 0.5 wt % of Au. As this alloy, commercial lead-free solder was used and the diameter was 0.5 mm. In Table 1, "Ni" and "Cu" mean metal nickel (Ni) and metal copper (Cu), respectively. As the negative electrode, metal nickel and metal copper wires were used. These diameters were 0.5 mm. In Table 2, "Ga" is the metal gallium (Ga). As the negative electrode, a wire of metal gallium was used. The wire of the metal gallium was produced in the following manner. That is to say, first, the metal Ga was put into a plastic container and liquefied using a hot bath in the range of 50 to 70° C. Next, the liquefied metal gallium was sucked up with a straw with an inner diameter φ of 2 mm until the straw was filled with the metal Ga. The straw was then cooled at −20° C. After that, the Ga metal was extracted from the straw as the metal wire and this metal wire was used as the negative electrode.

In "Experiments $N_a$-$N_b$" shown in Table 1, Na represents the kind of electrolyte, and $N_b$ represents the kind of negative electrode active material. Numerals 1 to 9 in $N_a$ correspond to the electrolytic solutions A to I, respectively. $N_b$ representing the kind of negative electrode active material is as shown below.

(Negative Electrode Active Material: $N_b$)

$N_b$=1: the metal zinc ("Zn" in Table 1)

$N_b$=2: the alloy containing 68 wt % of Pb and 32 wt % of Sn (eutectic solder alloy) ("Pb—Sn" in Table 1)

$N_b$=3: the alloy containing 96.5 wt % of tin (Sn), 3 wt % of silver (Ag), and 0.5 wt % of Au ("Sn—Ag—Au" in Table 1)

$N_b$=4: the metal nickel ("Ni" in Table 1)

$N_b$=5: the metal copper ("Cu" in Table 1)

(Preparation of Electrolytic Solution)

The phosphoric acid aqueous solution that was used in the experiment was obtained in a manner that the commercial 84% phosphoric acid solution was diluted with ion exchange water to achieve the intended concentration. Regarding 1 mol/L tripotassium phosphate aqueous solution, 1 mol of tripotassium phosphate was dissolved in ion exchange water to be 1 L at room temperature, so that 1 mol/L tripotassium phosphate was obtained. The electrolytic solutions E, F, and G were obtained by mixing a phosphoric acid aqueous solution with a predetermined concentration and a tripotassium phosphate aqueous solution with a predetermined concentration at a weight ratio of 2:1.

The potassium hydroxide aqueous solutions as the electrolytic solutions G and H were obtained in a manner that 1 mol or 15 mol of potassium hydroxide was dissolved in ion exchange water to generate 1 mol/L (electrolytic solution G) and 15 mol/L (electrolytic solution H) of aqueous solutions.

The p-toluene sulfonic acid aqueous solution as the electrolytic solution I was obtained by dissolving 0.5 mol of p-toluene sulfonic acid.monohydrate in ion exchange water to generate 1 L of aqueous solution.

The NaOH aqueous solutions as the electrolytic solutions J and K were obtained by dissolving commercial sodium hydroxide in ion exchange water to generate 1 mol/L (electrolytic solution J) and 15 mol/L (electrolytic solution K) of NaOH aqueous solutions.

The electrolytic solutions L, M, N, O, P, and Q were obtained by mixing the phosphoric acid aqueous solution with the predetermined concentration and the phosphate aqueous solution with the predetermined concentration at a weight ratio of 2:1.

The organic oxoacid (benzene sulfonic acid) aqueous solution as the electrolytic solution R was obtained by dissolving commercial benzene sulfonic acid in ion exchange water to generate 1 mol/L of aqueous solution.

The organic oxoacid (p-phenol sulfonic acid) aqueous solution as the electrolytic solution S was obtained by dissolving commercial p-phenol sulfonic acid in ion exchange water to generate 0.5 mol/L of aqueous solution.

The organic oxoacid (phenol phosphonic acid) aqueous solution as the electrolytic solution T was obtained by dissolving commercial phenyl phosphonic acid in ion exchange water to generate 0.2 mol/L of aqueous solution.

The organic oxoacid (5-sulfosalicylic acid) aqueous solution as the electrolytic solution U was obtained by dissolving commercial 5-sulfosalicylic acid in ion exchange water to generate 1 mol/L of aqueous solution.

The electrolytic solution V was obtained by mixing the phosphoric acid aqueous solution with the predetermined concentration and 1 mol/L of the phosphate aqueous solution ($Li_3PO_4$) at a weight ratio of 2:1.

The electrolytic solution W was obtained by adding the organic oxoacid (phenyl phosphonic acid) to the phosphoric acid aqueous solution with the predetermined concentration so that 0.2 mol/L was achieved.

The electrolytic solutions X, Y, Z, and a were obtained by adding organic oxoacid (phenyl phosphonic acid) to the mixed aqueous solution in which the phosphoric acid aqueous solution with the predetermined concentration and 1 mol/L of the predetermined phosphate aqueous solution were mixed at a weight ratio of 2:1 so that 0.2 mol/L was achieved.

The electrolytic solution β was obtained by mixing the phosphoric acid aqueous solution with the predetermined concentration and 1 mol/L of the phosphate $[(NH_4)_2HPO_4]$ aqueous solution at a weight ratio of 1:1.

The electrolytic solution γ was obtained by mixing the phosphoric acid aqueous solution with the predetermined concentration and 1 mol/L of the phosphate ($K_3PO_4$) aqueous solution were mixed at a weight ratio of 1:1.

The electrolytic solutions were prepared at room temperature of 25° C. The aforementioned commercial reagents are available in Wako Pure Chemical Corporation.

(Trial Production of Secondary Battery)

Figure 1:
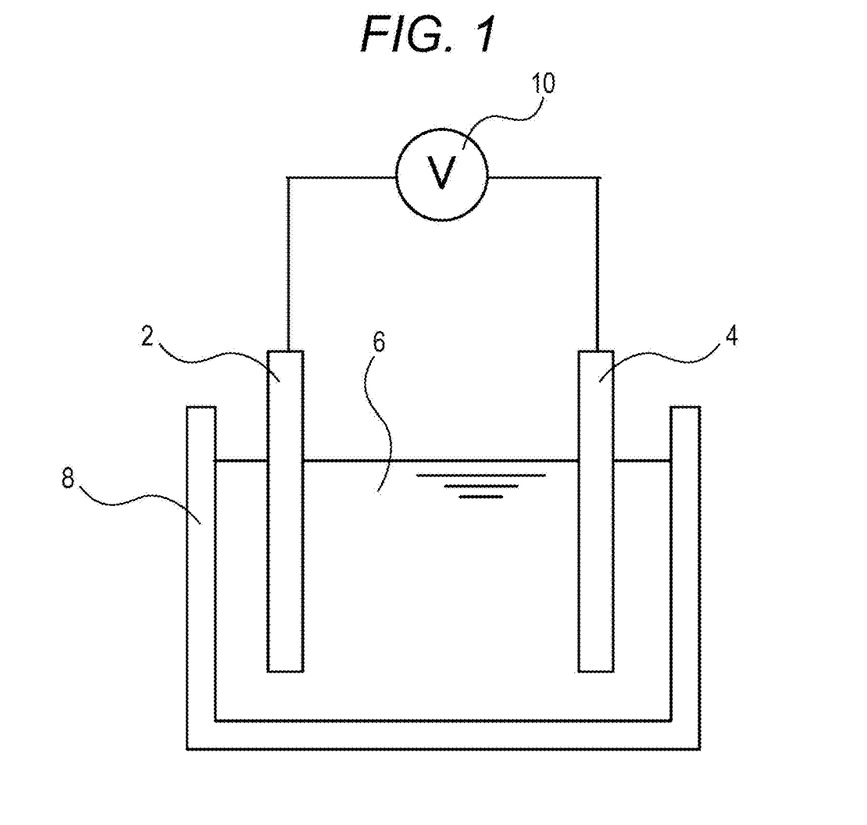
FIG. 1 is a schematic diagram in which an open circuit voltage of a secondary battery is measured.

As illustrated in FIG. 1, a test battery was produced and a charge-discharge test was performed. In the test battery, a carbon electrode covered with manganese oxide (positive electrode 2) and each kind of negative electrode active material (negative electrode 4) were set in a container 8 that is filled with any of the electrolytic solutions A to Z, α, β, and γ (electrolytic solution 6). These elements were arranged so that the manganese oxide covering the carbon electrode was entirely immersed in the electrolytic solution and a 1.5-cm part of the negative electrode active material was impregnated with the electrolytic solution. The distance between the electrodes was set to 1 cm. The amount of electrolytic solution was 40 ml each.

In any case, the charge-discharge test was performed at room temperature of 25° C. The discharge reaction with a discharge current of 10 µA for 30 minutes was carried out and the no-load state was provided for five minutes. Furthermore, the charge reaction with a charge current of 10 µA for 40 minutes was carried out the no-load state was provided for five minutes. This process is regarded as one cycle, and 50 cycles of the discharge reaction and the charge reaction were performed. Note that the term "open circuit voltage in fully charged state" herein described means the voltage value obtained after discharge with a current of 10 µA for 30 minutes and the no-load state for five minutes, and moreover charge with 10 µA for 40 minutes and the no-load state for five minutes were performed and before the next discharge reaction is started. Therefore, the open circuit voltage in the fully charged state is equivalent to the discharge start voltage in the next discharge reaction. Moreover, the term "initial open circuit voltage" herein described means the open circuit voltage after one cycle of discharge-charge.

Figure 6:
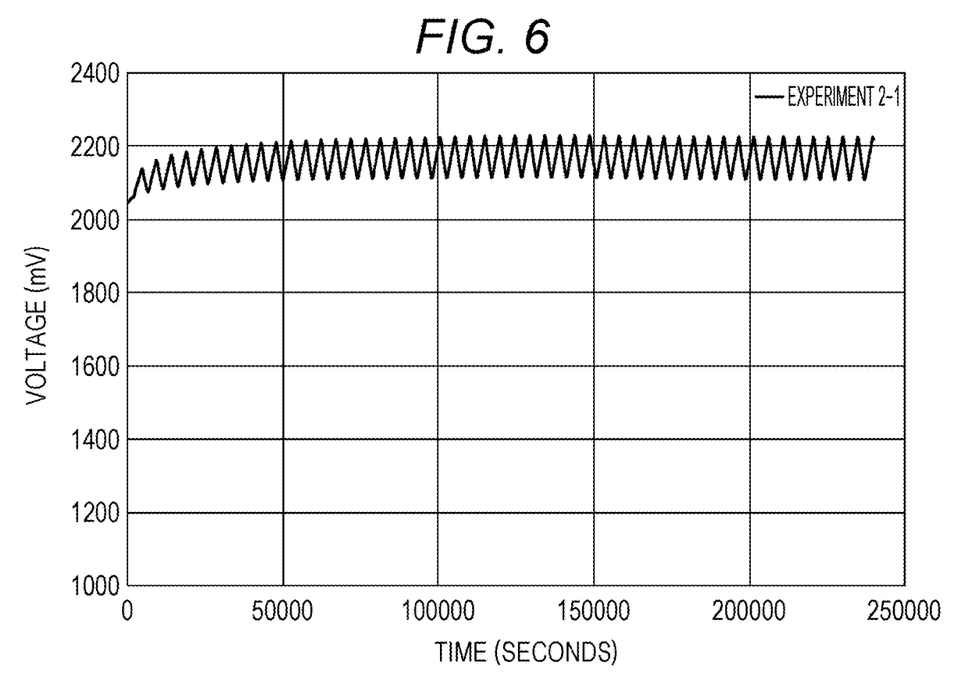
FIG. 6 is a diagram showing the voltage change in a charge-discharge test in Example (Experiment 2-1) of the present invention.
Figure 7:
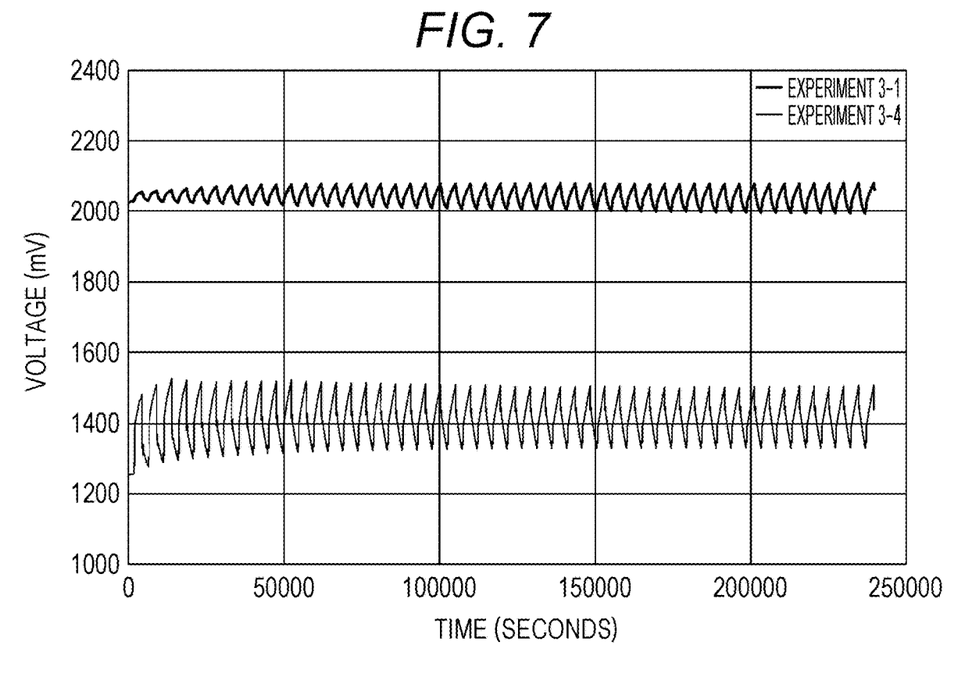
FIG. 7 is a diagram showing the voltage change in a charge-discharge test in Example (Experiment 3-1) and Comparative example (3-4) of the present invention.

Tables 1 and 2 show the results of the charge-discharge test. In Experiments 1-1, 1-2, 1-3, 2-1, 2-2, 2-3, 3-1, 3-2, 3-3, 4-1, 4-2, 4-3, 5-1, 5-2, 5-3, 6-1, 6-2, and 9-1 and Experiments 12 to 28 in all of which 50 charge-discharge tests were performed, the open circuit voltage after the end of charge was 1.6 V or more (Examples). On the other hand, in Experiments 3-4, 3-5, 6-3, 7-1, and 8-1, and Experiments 10, 11, and 29, the open circuit voltage after the end of charge was less than 1.6 V (Comparative examples). For comparison, FIG. 6 shows the voltage change in the charge-discharge test in Experiment 2-1. In addition, FIG. 7 shows the voltage change in the charge-discharge tests in Experiments 3-1 and 3-4. The above results indicate that the negative electrode metal or the alloy used in the battery with an open circuit voltage of 1.6 V or more is the metal with higher hydrogen overvoltage than the metal nickel and metal copper used in Experiment 3-4 and Experiment 3-5. For this reason, an open circuit voltage of 1.6 V or more can be generated. In any of the metals used in these experiments, the change in redox potential depending on the difference in electrolytic solution pH in the area where the electrolytic solution is acid is small. On the other hand, the oxygen overvoltage of manganese dioxide as the positive electrode active material changes depending on pH. As the electrolytic solution pH becomes lower, the oxygen overvoltage of manganese dioxide increases. Therefore, if the same metal is used for the negative electrode active material, usually, the battery has higher electromotive force when the electrolytic solution with lower pH is used. This is the reason why the open circuit voltage was less than 1.6 V in Experiment 6-3 (Comparative example). Therefore, in order to obtain an open circuit voltage of 1.6 V or more, the pH of the electrolytic solution is preferably 5 or less, more preferably 4 or less.

As Experiment 7-1 and Experiment 8-1 (Comparative examples), batteries were produced each using the aforementioned carbon electrode covered with manganese dioxide as a positive electrode and metal zinc as a negative electrode, and potassium hydroxide aqueous solution with a different concentration as the electrolytic solution, and the similar charge-discharge test was performed.

The voltage at the start of the discharge in Experiment 7-1 and Experiment 8-1 was 1.48 V and 1.51 V, respectively, and these voltages are relatively high. However, as the charge-discharge cycle is repeated, the open circuit voltage after the charge keeps decreasing. In particular, in Experiment 7-1, the open circuit voltage after the discharge and the open circuit voltage after the subsequent charge are not very different, and the decrease in battery voltage due to the discharge is always larger than the increase in battery voltage due to the charge. The reason is as described below. The reversibility of the electrode reaction due to the charge-discharge reaction of the active material of both or one of the positive electrode active material and the negative electrode active material is insufficient. Most of the power input to the battery in the charge operation is consumed in the electrolysis of the water and re-reduction of the negative electrode active material and re-oxidation of the positive electrode active material by the charge are insufficient. Thus, in the case of the alkali-manganese dry cell with the alkali electrolytic solution, the reversibility by the charge-discharge reaction is insufficient compared to that of the battery according to the present invention.

Figure 4:
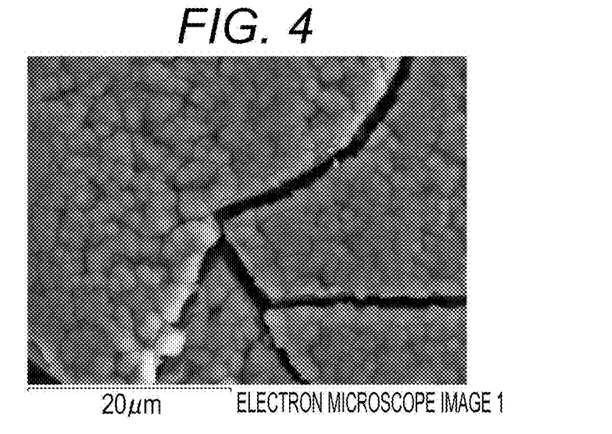
FIG. 4 is a surface SEM image of the carbon electrode covered with manganese dioxide that is used in Example (Experiment 2-1) of the present invention after complete discharge.
Figure 5:
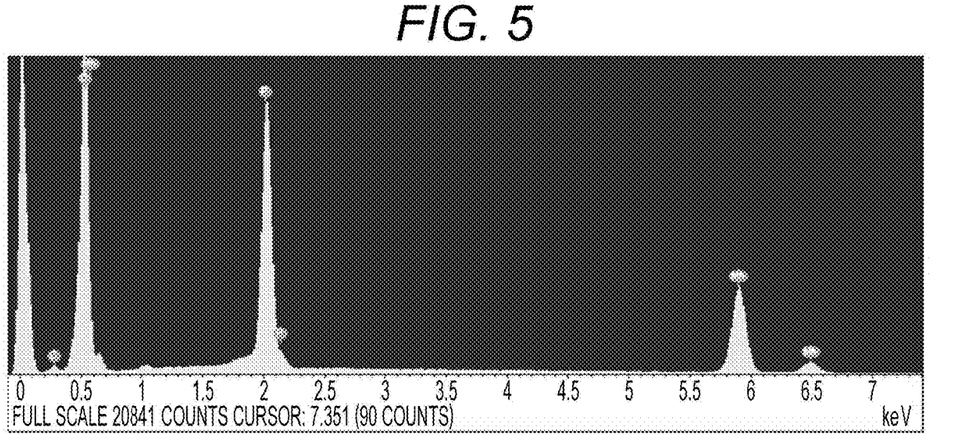
FIG. 5 shows results of surface analysis of a carbon electrode covered with manganese dioxide that is used in Example (Experiment 2-1) of the present invention after complete discharge in accordance with an energy dispersive X-ray spectroscopy device (EDS)

In addition, the present inventor has confirmed that as the discharge reaction of the battery according to the present invention is advanced, manganese dioxide as the positive electrode active material became manganese-phosphoric acid compound by the reaction with phosphate ions in the electrolytic solution. After the battery similar to that shown in Experiment 2-1 was constructed, the battery was discharged with a discharge current of 10 µA until the battery voltage reached 1.5 V. After that, the discharge reaction was stopped and the positive electrode was extracted. The positive electrode was cleaned sufficiently with ion exchange water, dried, and the surface was subjected to SEM observation (see FIG. 4). In addition, EDS analysis was performed (see FIG. 5). Here, the discharge reaction took 48.07 hours. In the SEM photograph in FIG. 4, a number of uneven parts were observed on the surface and this is different from the flat surface before the discharge (see FIG. 2). Furthermore, as a result of the EDS analysis, the composition of these uneven parts was the compound including manganese-phosphorus-oxygen.

Among the above tests, the results of the long-term charge-discharge test of Experiment 5-1 as one example in which the voltage was more than or equal to that of the lead-acid battery are also described and disclosed.

Figure 8:
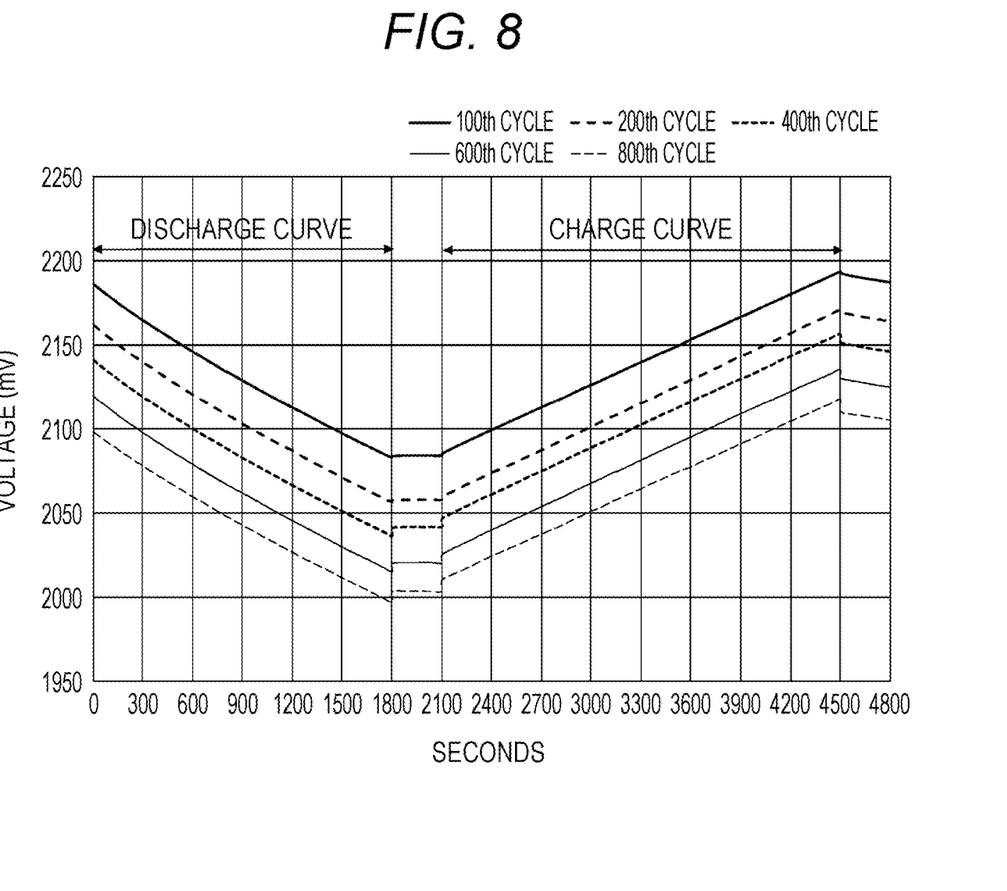
FIG. 8 shows charge-discharge curves in 100th, 200th, 400th, 600th, and 800th cycles in a long-term charge-discharge test in Example (Experiment 5-1) of the present invention.

FIG. 8 shows charge-discharge curves when the battery cell in Experiment 5-1 was subjected to the charge-discharge tests for 50 cycles and then continuously charged and discharged up to 800 cycles. That is to say, FIG. 8 shows the charge-discharge curves in 100th, 200th, 400th, 600th, and 800th cycles and the change of the charge-discharge behavior in each cycle.

As shown in FIG. 8, in the battery cell in Experiment 5-1, as the number of charge-discharge cycles increases, the charge voltage and the discharge voltage both decrease a little. The average open circuit voltage decrease rate was obtained from the open circuit voltage after the 100th cycle charge and the open circuit voltage after the charge-discharge in the 800th cycle. From the difference between charge-discharge open circuit voltages and the number of cycles, the average open circuit voltage decrease rate per cycle in this charge-discharge period was about 0.12 mV/cycle, and the favorable charge-discharge cycle characteristic was exhibited.

TABLE 1

|  | Electrolytic solution | Negative electrode active material | Initial open circuit voltage (V) after one cycle of discharge-charge | Open circuit voltage (V) after 50 cycles of discharge-charge | Note |
| --- | --- | --- | --- | --- | --- |
| Experiment 1-1 | Electrolytic solution A | Zn | 2.21 | 2.22 | Example |
| Experiment 1-2 | Electrolytic solution A | Pb—Sn | 1.73 | 1.75 | Example |
| Experiment 1-3 | Electrolytic solution A | Sn—Ag—Au | 1.63 | 1.65 | Example |
| Experiment 2-1 | Electrolytic solution B | Zn | 2.13 | 2.22 | Example |
| Experiment 2-2 | Electrolytic solution B | Pb—Sn | 1.70 | 1.74 | Example |
| Experiment 2-3 | Electrolytic solution B | Sn—Ag—Au | 1.68 | 1.73 | Example |
| Experiment 3-1 | Electrolytic solution C | Zn | 2.05 | 2.06 | Example |
| Experiment 3-2 | Electrolytic solution C | Pb—Sn | 1.65 | 1.70 | Example |
| Experiment 3-3 | Electrolytic solution C | Sn—Ag—Au | 1.68 | 1.68 | Example |

TABLE 1-continued

|  | Electrolytic solution | Negative electrode active material | Initial open circuit voltage (V) after one cycle of discharge-charge | Open circuit voltage (V) after 50 cycles of discharge-charge | Note |
| --- | --- | --- | --- | --- | --- |
| Experiment 3-4 | Electrolytic solution C | Ni | 1.34 | — | Comparative example |
| Experiment 3-5 | Electrolytic solution C | Cu | 1.05 | — | Comparative example |
| Experiment 4-1 | Electrolytic solution D | Zn | 2.05 | 2.08 | Example |
| Experiment 4-2 | Electrolytic solution D | Pb—Sn | 1.65 | 1.62 | Example |
| Experiment 4-3 | Electrolytic solution D | Sn—Ag—Au | 1.60 | 1.70 | Example |
| Experiment 5-1 | Electrolytic solution E | Zn | 1.97 | 2.18 | Example |
| Experiment 5-2 | Electrolytic solution E | Pb—Sn | 1.55 | 1.76 | Example |
| Experiment 5-3 | Electrolytic solution E | Sn—Ag—Au | 1.54 | 1.61 | Example |
| Experiment 6-1 | Electrolytic solution F | Zn | 1.79 | 1.85 | Example |
| Experiment 6-2 | Electrolytic solution F | Pb—Sn | 1.38 | 1.68 | Example |
| Experiment 6-3 | Electrolytic solution F | Sn—Ag—Au | 1.35 | 1.45 | Comparative example |
| Experiment 7-1 | Electrolytic solution G | Zn | 1.48 | 1.31 | Comparative example |
| Experiment 8-1 | Electrolytic solution H | Zn | 1.51 | 1.41 | Comparative example |
| Experiment 9-1 | Electrolytic solution I | Zn | 2.02 | 2.03 | Example |

TABLE 2

|  | Electrolytic solution | Negative electrode active material | Initial open circuit voltage (V) after one cycle of discharge-charge | Open circuit voltage (V) after 50 cycles of discharge-charge | Note |
| --- | --- | --- | --- | --- | --- |
| Experiment 10 | Electrolytic solution J | Zn | 1.46 | 1.37 | Comparative example |
| Experiment 11 | Electrolytic solution K | Zn | 1.52 | 1.42 | Comparative example |
| Experiment 12 | Electrolytic solution L | Zn | 2.09 | 2.10 | Example |
| Experiment 13 | Electrolytic solution M | Zn | 1.99 | 2.03 | Example |
| Experiment 14 | Electrolytic solution N | Zn | 1.75 | 1.61 | Example |
| Experiment 15 | Electrolytic solution O | Zn | 2.11 | 2.10 | Example |
| Experiment 16 | Electrolytic solution P | Zn | 2.02 | 2.05 | Example |
| Experiment 17 | Electrolytic solution Q | Zn | 1.97 | 2.01 | Example |
| Experiment 18 | Electrolytic solution R | Zn | 2.09 | 2.07 | Example |
| Experiment 19 | Electrolytic solution S | Zn | 1.90 | 1.63 | Example |
| Experiment 20 | Electrolytic solution T | Zn | 2.04 | 2.04 | Example |
| Experiment 21 | Electrolytic solution U | Zn | 1.99 | 1.69 | Example |
| Experiment 22 | Electrolytic solution V | Zn | 1.87 | 1.93 | Example |
| Experiment 23 | Electrolytic solution W | Zn | 2.05 | 1.89 | Example |
| Experiment 24 | Electrolytic solution X | Zn | 1.98 | 2.03 | Example |
| Experiment 25 | Electrolytic solution Y | Zn | 2.02 | 2.07 | Example |
| Experiment 26 | Electrolytic solution Z | Zn | 1.96 | 1.91 | Example |
| Experiment 27 | Electrolytic solution α | Zn | 1.92 | 1.94 | Example |

TABLE 2-continued

|  | Electrolytic solution | Negative electrode active material | Initial open circuit voltage (V) after one cycle of discharge-charge | Open circuit voltage (V) after 50 cycles of discharge-charge | Note |
|---|---|---|---|---|---|
| Experiment 28 | Electrolytic solution β | Ga | 1.76 | 1.81 | Example |
| Experiment 29 | Electrolytic solution γ | Zn | 1.37 | 1.22 | Comparative example |

LIST OF REFERENCE NUMERALS

2 Positive electrode
4 Negative electrode
6 Electrolytic solution
8 Container
10 Voltmeter

The invention claimed is:

1. A secondary battery comprising:
a positive electrode including a positive electrode active material containing manganese oxide;
a negative electrode including a negative electrode active material containing at least one selected from the group consisting of zinc, gallium, and tin; and
an electrolytic solution, which is in direct contact with both of the positive electrode and the negative electrode, containing at least one selected from the group consisting of phosphoric acid and organic oxoacid and having a pH of less than 7 at 25° C., wherein an open circuit voltage in a fully charged state is more than 1.6 V and 2.21 V or less.

2. The secondary battery according to claim 1, wherein the electrolytic solution has a pH of 5 or less at 25° C.

3. The secondary battery according to claim 1, wherein a quantity of anions, in the electrolytic solution, that are derived from the phosphoric acid and/or the organic oxoacid is more than a total quantity of the anions that are required for reaction with the positive electrode active material and the negative electrode active material by discharge reaction.

4. The secondary battery according to claim 1, wherein the negative electrode active material contains zinc.

5. The secondary battery according to claim 4, wherein the open circuit voltage in the fully charged state is 2.0 V or more and 2.21 V or less.

6. The secondary battery according to claim 1, wherein the organic oxoacid is at least one selected from the group consisting of p-toluene sulfonic acid, benzene sulfonic acid, p-phenol sulfonic acid, phenyl phosphonic acid, and 5-sulfosalicylic acid.

7. The secondary battery according to claim 1, wherein the phosphoric acid includes orthophosphoric acid ($H_3PO_4$).

8. The secondary battery according to claim 1, wherein the electrolytic solution further contains an alkali metal phosphate or an ammonium phosphate.

9. The secondary battery according to claim 8, wherein the alkali metal phosphate is selected from the group consisting of $K_3PO_4$, $Li_3PO_4$, and $Na_3PO_4$, and the ammonium phosphate is $(NH_4)_2HPO_4$.

10. The secondary battery according to claim 1, wherein the electrolytic solution has a pH of 0 or more and less than 7 at 25° C.

11. A device comprising the secondary battery according to claim 1.

* * * * *